United States Patent [19]

Paulus et al.

[11] Patent Number: 5,512,324

[45] Date of Patent: Apr. 30, 1996

[54] METAL SUBSTRATE WITH INSULATIVE COATING THEREON AND METHOD OF MAKING THE SAME

[75] Inventors: Nancy J. Paulus, Grand Blanc; Terrence B. Boyer, Davison; Raymond E. Bedford, Burton, all of Mich.

[73] Assignee: General Motors Corporation, Detroit, Mich.

[21] Appl. No.: 337,708

[22] Filed: Nov. 14, 1994

[51] Int. Cl.⁶ .............................. B05D 1/38; B05D 1/02; B05D 3/02

[52] U.S. Cl. .................. 427/409; 427/379; 427/403; 427/419.2; 427/421

[58] Field of Search ................................ 427/409, 427, 427/403, 419.2, 419.3, 419.4, 388.2, 379, 421

[56] References Cited

U.S. PATENT DOCUMENTS

| | | | |
|---|---|---|---|
| 3,982,981 | 9/1976 | Takao et al. | 156/89 |
| 4,059,712 | 11/1977 | Bothwell | 427/376.2 |
| 4,231,900 | 11/1980 | Kato et al. | 427/380 |
| 4,631,269 | 12/1986 | Lachman et al. | 502/439 |
| 4,711,009 | 12/1987 | Cornelison et al. | 29/157 R |
| 4,976,929 | 12/1990 | Cornelison et al. | 422/174 |
| 4,987,003 | 1/1991 | Schuster et al. | 427/427 |
| 5,250,489 | 10/1993 | Dalla Betta et al. | 502/262 |
| 5,277,937 | 1/1994 | Bagley et al. | 427/376.2 |
| 5,393,499 | 2/1995 | Bagley et al. | 422/174 |

Primary Examiner—Diana Dudash
Attorney, Agent, or Firm—Cary W. Brooks

[57] ABSTRACT

The invention includes a metal substrate having an insulative coating thereon, wherein the insulative coating is prepared from a composition including γ-alumina (gamma alumina) with a wide particle size distribution that includes at least 10 percent of the particles having by weight being larger than 20 micrometers, 5 to 10 percent by weight pseudo-boehmite, and a catalyst. The composition is sprayed onto the metal substrate at a distance from about 12 to about 15 inches using a round orifice spray nozzle operated at a pressure ranging from about 15 to about 25 psi. A polyvinyl alcohol overcoat is applied to the insulative coating to prevent flaking and chipping when coated metal substrate are stacked on each other. The insulative coating is particularly useful on folded foils used to construct metal monoliths for electrically heating catalytic converters.

5 Claims, 1 Drawing Sheet

METAL SUBSTRATE WITH INSULATIVE COATING THEREON AND METHOD OF MAKING THE SAME

FIELD OF THE INVENTION

This invention relates to a metal substrate with an insulative coating thereon, and more particularly, to a catalytic converter metal monolith having an insulative coating thereon.

BACKGROUND OF THE INVENTION

Applying an insulative coating to a metal substrate can be a troublesome task. When the insulative coating applied includes other components such as precious metals, coating adherence problems often arise. Further, when the insulative coating includes additional components, the rheology of the slurry used to apply the coating should be sufficient to apply the coating easily yet prevent settling of the components. Further, the techniques and process parameters used to apply the coating to the metal substrate may adversely affect the coating performance. An insulative coating may be applied to a folded metal substrate by dipping the substrate into a coating bath. However, dipping has the disadvantage of traversing of the coating from the peaks to the valley of the folded metal substrate. Additional problems may arise if the coated metal substrate undergoes subsequent process steps.

The present invention overcomes many of the deficiencies of prior art metal substrates with insulative coatings and methods of making the same.

SUMMARY OF THE INVENTION

The invention includes a metal substrate having an insulative coating thereon, wherein the insulative coating is prepared from a composition including about 65 to about 95 weight percent γ-alumina (gamma alumina) with a wide particle size distribution that includes at least 10 percent of the particles having by weight being larger than 20 micrometers, 5 to 10 percent pseudo-boehmite, and a catalyst. The composition is sprayed onto the metal substrate at a distance from about 6 to about 12 inches to provide a first layer. Thereafter a second layer is sprayed on the first layer at a distance of about 3 to 6 inches. The spray nozzle is operated at a pressure ranging from about 15 to about 25 psi. A polyvinyl alcohol overcoat is applied to the insulative coating to prevent flaking and chipping when coated metal substrate are stacked on each other. The insulative coating is particularly useful on folded foils used to construct metal monoliths for electrically heated catalytic converters.

These and other objects features and advantages will become apparent from the following detailed description and appended claims.

DETAILED DESCRIPTION

Figure 1:
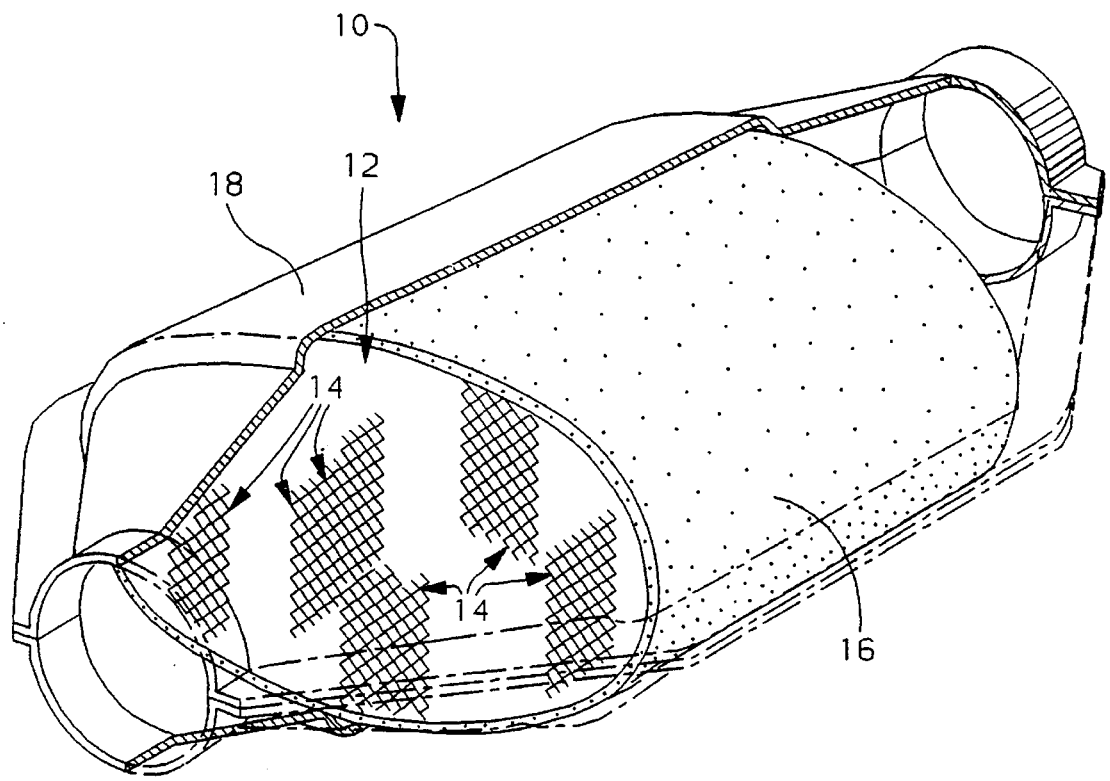
FIG. 1 is an illustration of a metal monolith catalytic converter having an insulative coating according to the present invention.

FIG. 1 illustrates a catalytic converter 10 having a monolith 12 formed from a plurality of folded metal foils 14, an insulator 16 and a housing 18. According to the present invention, an insulative coating is sprayed onto each piece of folded metal foil. The insulative coating includes γ-alumina particles and a catalyst such as palladium, platinum, or rhodium. The insulative coating is prepared from a composition including about 65 to about 95 weight percent γ-alumina particles. The γ-alumina particles have a particle size distribution which includes at least 10 percent of the particles being greater than 20 micrometers. The γ-alumina particle size distribution is such that 90 percent by volume are finer than 26 micrometers, 50 percent by volume are finer than 7.5 micrometers, and 10 percent by volume are finer than 1.3 micrometers. The particle distribution can be achieved by milling Catapal G alumina for 3 hours in a mill having the characteristics of 1 gallon mill with 4500 grams of ⅝ inch $Al_2O_3$ milling media and a charge of 800 grams alumina and water. The insulative coating also includes about 5 to about 10 weight percent pseudo-boehmite gel which is added to allow the insulative composition to be sprayed easily but prevents settling of the alumina and catalyst. The specific amount of pseudo-boehmite is found not to adversely affect the adherence of the coating to the metal foil. The insulative coating includes about 0.01 to about 0.03 weight percent of catalyst which may be at least one selected from the group consisting of platinum, palladium, and rhodium. The balance of the insulative coating composition is cerium oxide and water.

The insulative coating is sprayed onto the folded metal foils using a round orifice spray gun available from Reb Enterprises company under the trade name Binks. The spray gun is operated at a pressure ranging from about 15 to about 25 lbs/inch². Approximately 10 to 20 percent of the total coating being applied to the metal foil is applied by spraying the coating onto the foil at a distance ranging from about 6 to 12 inches to form a first layer, and the remainder being applied by spraying at a distance from about 3 to 6 inches. The coating is applied to the metal foil to a thickness ranging from about 0.05 to about 0.075 millimeters and so that the coating amounts to about 30 to about 43 weight percent of the uncoated foil. The coating has a 40 to 50 percent by volume solids, and about 100 to about 700 centipoise viscosity when sprayed. When the coating is so applied, it has very good adhesion and avoids the prior art problem of traversing from peak 20 to valley 22 of the folded metal substrate 14. After spraying, the coated metal foil is dried and calcined in an oxidizing atmosphere temperature ramping from room temperature to 450° C., and holding at 450° C. for 1 hour.

We have found that if all the insulative coating is sprayed at a distance from 12 to 15 inches from the substrate, the powder hits the dry surface and forms a rough coating that does not adhere. If all the insulative coating is sprayed at about 3 to 6 inches from the substrate, the coating is very fluid and nonuniform with build up occurring in the valleys of the folded metal and cracking occurring during drying.

Figure 2:
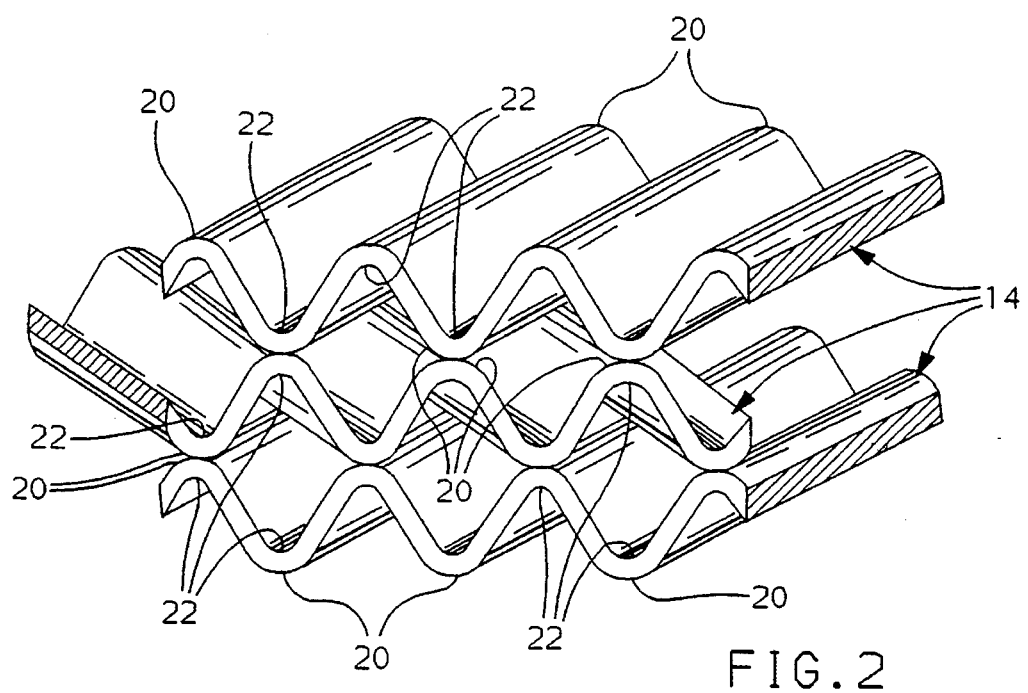
FIG. 2 is an illustration of a folded metal foil used in the present invention.

An overcoat of about 0.125 g to about 0.245 g per gram of calcined washcoat, approximately 8 percent by weight polyvinyl alcohol in water is applied to the insulative coating either by spraying, dipping or brushing. The overcoat is dried at room temperature or in an oxidizing atmosphere up to 60° C. The polyvinyl alcohol is used as a protective coating for the insulative coating to prevent chipping and cracking when the folded metal foils (FIG. 2) are stacked on top of each other to build the catalytic converter monolith shown in FIG. 1. The polyvinyl alcohol was tried at various concentrations ranging from 3–10 percent. At concentration of 9 and 10 percent the material was too thick to be sprayed. On the other hand, PVA concentrations below 7 percent did not produce the desired results, because the coatings produced did not effectively protect the washcoat during the handling tests.

The embodiments of the invention in which an exclusive property or privilege is claimed are defined as follows:

1. A method comprising:

a first step of spraying an insulative coating onto a corrugated metal substrate at a distance ranging from about 6 to about 12 inches to provide a first layer amounting to about 10 to 20 weight percent of the total insulative coating to be applied so that build up of the insulative coating does not occur in the valley of the corrugated metal substrate and cracking of the insulative coating does not occur during drying of the insulative coating, and thereafter a second step of spraying said insulative coating onto the first layer at a distance ranging from about 3 to 6 inches, wherein said insulative coating comprises γ-alumina having at least 10 percent by weight particles larger than 20 micrometers, about 0.01 to about 0.03 weight percent of a catalyst, and about 5 to about 10 weight percent pseudo-boehmite gel;

drying said insulative coating;

applying an overcoat of polyvinyl alcohol in water to the insulative coating and drying the overcoat; and stacking a plurality of folded metal substrates, each substrate having the insulative coating and overcoat thereon, on top of each other to build a monolith for a catalytic converter.

2. A method as set forth in claim 1 wherein said overcoat comprise about 8 weight percent polyvinyl alcohol in water.

3. A method as set forth in claim 1 further comprising electrically heating said monolith.

4. A method comprising:

a first step of spraying an insulative coating onto a metal substrate at a distance ranging from about 6 to about 12 inches from the substrate to provide a first layer amounting to about 10 to 20 weight percent of the total insulative coating to be applied to the substrate, and thereafter a second step of spraying said insulative coating onto the first layer at a distance ranging from about 3 to 6 inches from said first layer, wherein said insulative coating comprises γ-alumina having at least 10 percent by weight particles larger than 20 micrometers, about 0.01 to about 0.03 weight percent of a catalyst, and about 5 to about 10 weight percent pseudo-boehmite gel; and drying said insulative coating.

5. A method as set forth in claim 4 further comprising applying an overcoat of polyvinyl alcohol in water to the insulative coating and drying the overcoat.

\* \* \* \* \*